United States Patent [19]

Hurth

[11] Patent Number: 5,211,610
[45] Date of Patent: May 18, 1993

[54] REDUCTION-DISTRIBUTION UNIT PARTICULARLY SUITABLE FOR INDUSTRIAL MACHINES

[75] Inventor: Fritz C. A. Hurth, Montagnola, Switzerland

[73] Assignee: Hurth Axle S.p.A., Italy

[21] Appl. No.: 708,476

[22] Filed: May 31, 1991

[30] Foreign Application Priority Data

Jun. 4, 1990 [IT] Italy ............................. 20520 A/90

[51] Int. Cl.⁵ .................................................. F16H 37/06
[52] U.S. Cl. ................................................ 475/1; 475/2; 475/23; 475/24
[58] Field of Search ................ 475/1, 2, 10, 23, 24, 475/28

[56] References Cited

U.S. PATENT DOCUMENTS

| 1,696,836 | 12/1928 | Bushyager | 475/1 |
| 3,583,256 | 6/1971 | Livezey | 475/24 |
| 3,966,005 | 6/1976 | Binger | 475/24 X |
| 4,183,264 | 1/1980 | Reed | 475/24 |
| 4,274,302 | 6/1981 | Herscovici | 475/1 X |
| 4,799,401 | 1/1989 | Reed | 475/24 |
| 4,803,897 | 2/1989 | Reed | 475/6 |
| 4,825,721 | 5/1989 | Gabriele | 475/1 X |
| 4,848,186 | 7/1989 | Dorgan et al. | 475/28 X |
| 4,997,412 | 3/1991 | Reed | 475/24 |

Primary Examiner—Richard Lorence
Assistant Examiner—Daniel Wittels
Attorney, Agent, or Firm—Dressler, Goldsmith, Shore, Sutker & Milnamow, Ltd.

[57] ABSTRACT

Reduction-distribution unit for gearshift units, particularly for industrial machines, including a first hydrostatic motor and a second hydrostatic motor which are operatively associated for the transmission of the motion to the axles. The unit also comprises an epicyclic train which adds the power of the hydrostatic motors, the first motor being associated with the shaft of the sun gear and the second motor being associated with the shaft of the crown gear of the epicyclic train. A first brake and a second brake are respectively associated to the shaft of the sun gear and to the shaft of the crown gear.

13 Claims, 3 Drawing Sheets

5,211,610

REDUCTION-DISTRIBUTION UNIT PARTICULARLY SUITABLE FOR INDUSTRIAL MACHINES

BACKGROUND OF THE INVENTION

The present invention relates to a reduction-distribution unit particularly suitable for industrial machines.

As is known, gearshift units are frequently used in industrial machines, for example earth-moving machines; those units are formed by a variable-displacement hydrostatic pump connected to the thermal engine and by a variable-displacement hydrostatic motor which is connected to the wheels.

This known solution has the severe disadvantage of having a limit in the obtainable conversion ratio, which is approximately equal to three times, by adjusting the displacement of the pump, and to another three times by adjusting the displacement of the motor, for a total of approximately nine times.

This aspect limits the maximum speed of these vehicles to approximately 18 km/h with an operating speed of approximately 2 km/h under maximum traction stress.

Power-shift units with two-three speeds have been studied in order to try and obviate this limit, and ensure a working speed comprised between 2 and 10 km/h, a possible intermediate speed comprised between approximately 4 and 20 km/h and a travel speed which is comprised between 7.6 and 38 km/h.

A problem shown by power-shift units mounted downstream of the hydrostatic motor is constituted by the inertia in the variation of the displacement of the pump or of the hydrostatic motor during power-shifting, which is a necessary condition in order to vary the rotation rate due to the non-compressibility of the fluid. It is therefore necessary to intervene synchronously both on the power-shift unit and on the hydrostatic unit, which must necessarily be equipped with an electronic adjustment; quality in the gear shifting step is generally unsatisfactory.

As an alternative, two hydrostatic motors with conventional adding gear systems have also been used; said motors exploit the possibility of making one of the two motors run idle at high rpm, thus increasing the conversion ratio, since at low speeds both motors operate and add their torques proportionately to their displacement, distributing the flow-rate of the pump.

However, the motor which is driven idle at high rpm absorbs considerable power, so that other solutions have been sought to improve the system by disconnecting the inoperative motor by means of a clutch and by locking it with a brake.

All the above described solutions have however generally turned out to be complicated from a constructive point of view and to have a relatively low efficiency.

SUMMARY OF THE INVENTION

The aim of the invention is indeed to eliminate the disadvantages described above by providing a reduction-distribution unit for gearshift units particularly for industrial machines which allows to obtain a very high conversion ratio without thereby having constructive complications, without requiring intervention on the adjustment of the hydrostatic units arranged upstream and thus obtaining a high quality in gear shifting without the use of modulations; this is possible since the system, during its operation, passes without discontinuities through a series of mechanical and hydraulic equilibrium conditions.

Within the scope of the above described aim, a particular object of the invention is to provide a reduction-distribution unit which minimizes power loss, thus obtaining a very high useful efficiency.

Another object of the present invention is to provide a reduction-distribution unit which, by virtue of its peculiar characteristics, is capable of giving the greatest assurances of reliability and safety in use.

Not least object of the present invention is to provide a reduction-distribution unit which can be easily obtained starting from commonly commercially available elements and materials and is furthermore competitive from a merely economical point of view.

The above described aim, the objects mentioned and others which will become apparent hereinafter are achieved by a reduction-distribution unit for gearshift units particularly for industrial machines, according to the invention, which comprises a first hydrostatic motor and a second hydrostatic motor which are operatively associated for transmitting the motion to the axles, characterized in that is comprises an epicyclic train which adds the power of said hydrostatic motors, has said first motor associated with the sun gear shaft and said second motor associated with the shaft of the crown gear of said epicyclic train.

BRIEF DESCRIPTION OF THE DRAWINGS

Further characteristics and advantages will become apparent from the description of a preferred but not exclusive embodiment of a reduction-distribution unit for gearshift units particularly for industrial machines, according to the invention, illustrated only by way of nonlimitative example in the accompanying drawings, wherein.

DESCRIPTION OF THE PREFERRED EMBODIMENTS

Figure 1:
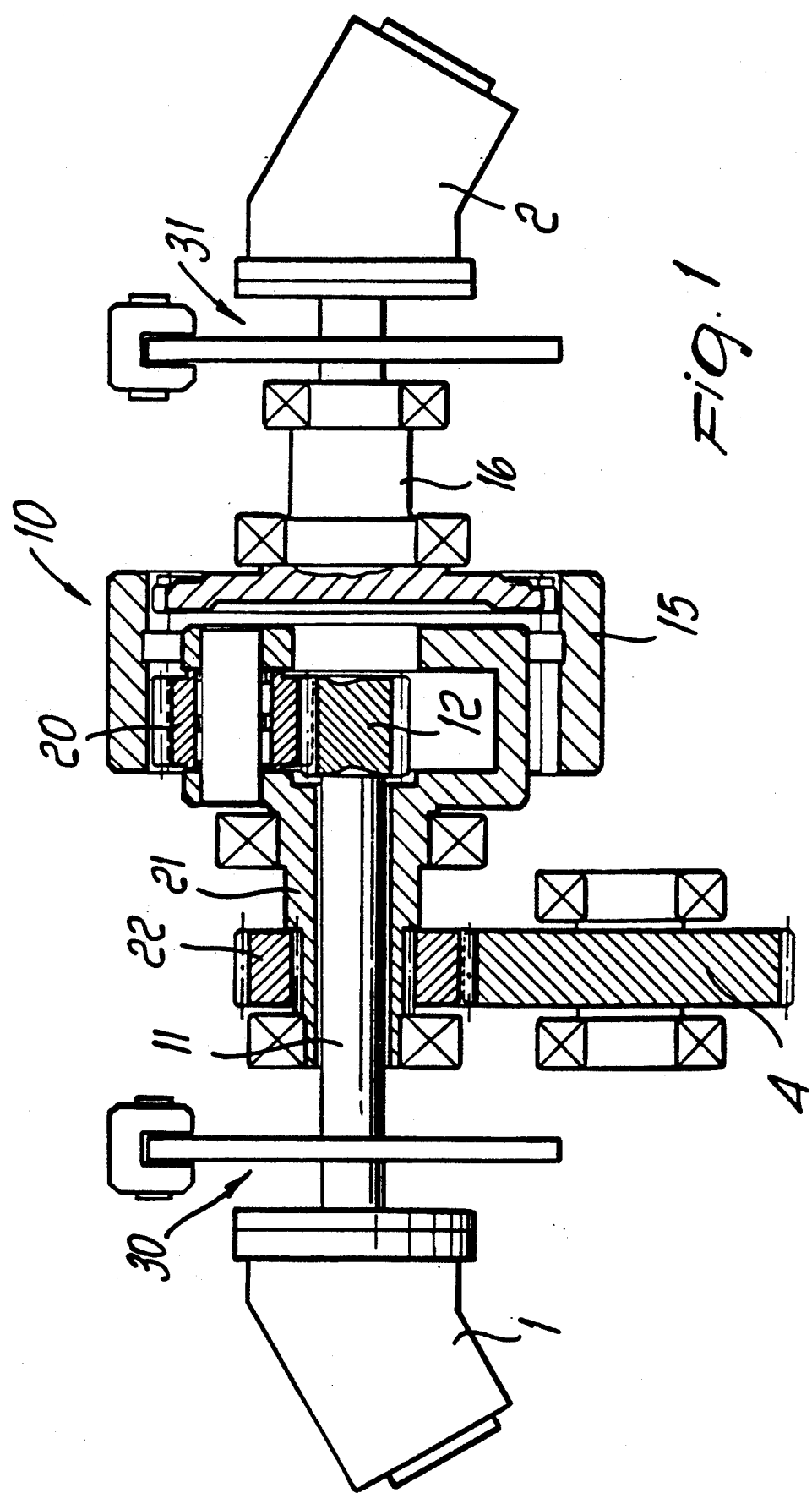
FIG. 1 is a schematic sectional view of the reduction-distribution unit according to the invention.

With reference to the above figures, and in particular to FIG. 1, the reduction-distribution unit for gearshift units of industrial machines, particularly for earth-moving machines, comprises a first hydrostatic motor 1 and a second hydrostatic motor 2 in fluid communication with a conventional variable-displacement hydrostatic pump and which are operatively associated with an epicyclic train, which is generally indicated by the reference numeral 10, and is operatively associated with the axles for the transmission of the motion by means of the gear 4.

An epicyclic train 10 is interposed between the first motor 1 and the second motor 2, adds the power of the hydrostatic motors and has a first shaft 11 to which the sun gear 12, associated with the first motor 1, is connected.

The outer crown gear 15 of the epicyclic train is associated with a second shaft 16 which is operatively associated with the second hydrostatic motor 2.

The epicyclic train furthermore comprises a plurality of planet gears 20 which mesh with the internal set of teeth of the crown gear 15 and with the sun gear 12 and are rotatably supported by a spider 21 on which an output gear 22 is keyed; said gear 22 meshes with the further gear 4 which transmits the motion to the axle.

To the above it should also be added that a first brake 30 is associated at the first shaft 11 and a second brake 31 is associated at the second shaft 16.

The reduction-distribution unit thus provided has a fundamental ratio $\tau_0$ which is advantageously comprised between $-54$ and $-1$, so as to operate as high-ratio $(1-\tau_0)$ reduction unit when, in a first step, only the hydrostatic motor associated with the sun gear rotates while the outer crown gear is locked by the second brake 31 associated with the second shaft and the output is connected to the gear 4.

The condition of maximum torque in output is obtained when the variable-displacement pump delivers the maximum allowed pressure and the hydrostatic motor operates at maximum displacement.

The first step of conversion is obtained, as in conventional cases, by reducing by approximately three times the displacement of the motor associated with the sun gear (vehicle speed between 2 and 5.5 km/h).

Adjustment stops when the torque of the first hydrostatic motor in operation is such as to obtain the equilibrium of the epicyclic train, since the torque of the brake is identical to that which can be delivered by the idle motor.

At this point it is possible to release the brake 31 and the previously idle motor 2 accelerates while the previously running motor 1 decelerates until the same rotation rate is obtained, balancing the flow-rate of the pump between the two hydrostatic motors.

The obtainment of equal speeds can be easily achieved by means of a trim adjustment of the displacement of one of the two hydrostatic motors.

Such step is not essential for the proper functioning of the invention, as will be better explained hereinafter and is only cited for the sake of the completeness of the description.

The second step of conversion is performed by varying the displacement of the hydrostatic pump, increasing the flow-rate and decreasing the pressure of the fluid as in a normal application.

The rigid rotation of the adder epicyclic train allows a better efficiency in the central operating step which is comprised for example between 5.5 and 13 km/h.

The third step begins by locking the brake 30 associated with the first motor and with the sun gear and by allowing the motor 2 connected to the crown gear to accelerate to an equal output speed.

This step is then performed by reducing the displacement of the hydrostatic motor 2 associated with the crown gear by approximately three times, consequently increasing the rotation rate and therefore the speed from 13 km/h to 38 km/h.

Figure 2:
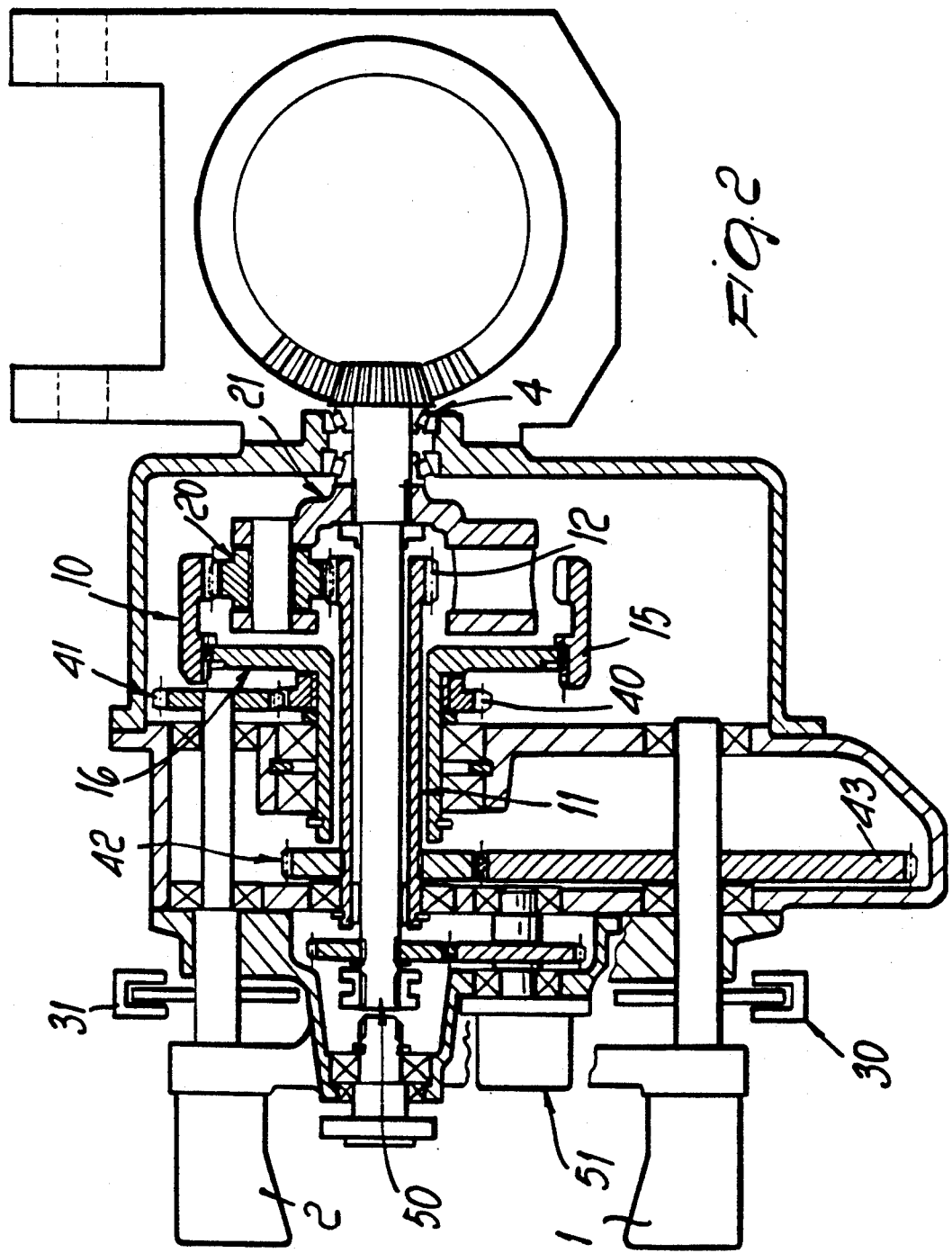
FIG. 2 is a view of the reduction-distribution unit with a different structural configuration.
Figure 3:
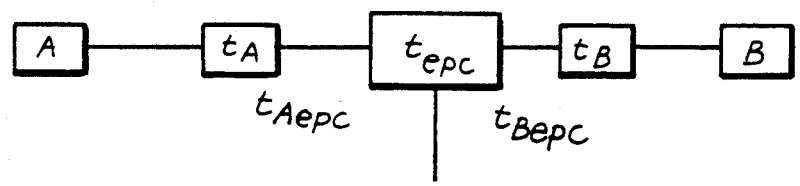
FIG. 3 is a diagram showing the gear ratios of the kinematic chains interposed between the motors A and B.

With reference to FIG. 2, the distribution unit comprises, besides the first hydrostatic motor 1 and the second hydrostatic motor 2, which are operatively associated with the epicyclic train which is generally indicated by the reference numeral 10 and is connected to the axles 11 for the transmission of the motion by means of the gears 4, a pair of gears 42 and 43 which are interposed between the first motor 1 and the shaft 11 and a second pair of gears 40, 41 which is interposed between the motor 2 and the shaft 16.

The function of the gears 40, 41, 42, 43 is to allow to vary the dimensions of the applied motors and the obtainable overall conversion ratio without modifying the epicyclic train 10 which adds the power of the hydrostatic motors.

The disengageable coupling for forward traction 50 and the emergency steering pump 51 do not constitute an essential element of the invention and are illustrated only for the sake of the completeness of the configuration.

Assuming a maximum vehicle speed equal to 38.18 Km/h (40+5% Km/h−10% regulator) and a minimum work speed of 2 Km/h (typical for loading shovels) the total conversion ratio (t.c.r.) is 38.18/2=19.09.

Figure 4:
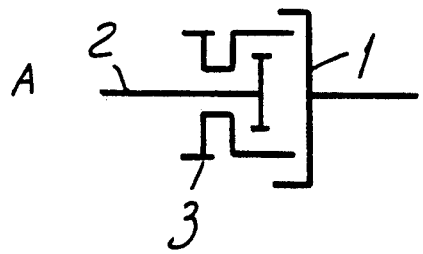
FIG. 4 is a system configuration according to a particular case exemplifying the invention.

A more general diagram is shown in FIG. 4 where $t_A$ and $t_B$ are the gear ratios of the kinematic chains generic for i-ratios interposed between the motors A and B, $t_{epc}$ is the gear ratio of the adder epicyclic train, $t_{Aepc}$ is the total gear ratio relative to motor A, $t_{Bepc}$ is the total gear ratio relative to motor B.

Assuming the two hydrostatic motors (A and B) equal and c being the conversion ratio of the motor, the equilibrium equations of the transmission in the various operating stages from the condition of maximum speed could be written:

$$\frac{B}{c} * t_{iB} * t_{Bepc} = t_{iB} * t_{Bepc} * \frac{A}{c}$$

$$B * t_{iB} * t_{Bepc} = t_{iB} * t_{Bepc} * A$$

$$\frac{A}{c} * t_{iA} * t_{Aepc} = t_{iB} * t_{Bepc} * A$$

$$A * t_{iA} * t_{Aepc} = t_{iB} * t_{Bepc} * A * c$$

$$\frac{B}{c} * t_{(i-1)B} * t_{Bepc} = t_{iB} * t_{Bepc} * A * c$$

$$B * t_{(i-1)B} * t_{Bepc} = t_{iB} * t_{Bepc} * A * c^2$$

$$\frac{A}{c} * t_{(i-1)A} * t_{Aepc} = t_{iB} * t_{Bepc} * A * c^2$$

$$A * t_{(i-1)A} * t_{Aepc} = t_{iB} * t_{Bepc} * A * c^3$$

etc etc where $t_i$ is the gear ratio in the i-th speed.

Considering three particular cases to exemplify the possibilities of the invention:

case 1)

motor A directly connected to the sun gear of the epicyclic reduction unit motor B directly connected to the crown gear of the epicyclic reduction unit thence $t_A = t_B = 1$ supposing the adjustment of the pump and of the motors constant and equal to c, it is obtained that $$c = \sqrt[3]{t.c.r.} = \sqrt[3]{19.09} = 2.673$$

We could then write $$A * t_A * t_{Aepc} = A * c * t_B * t_{Bepc}$$

$$\frac{t_{Bepc}}{t_{Aepc}} * c = 1$$

now, indicating by 1 the crown gear, 2 the sun gear, 3 the spider and $M_1$, $M_2$, $M_3$ the corresponding acting torques, it is obtained the configuration shown in FIG. 4

$$t_{Bepc} = \frac{M_3}{M_2} = \frac{t_o - 1}{t_o} \quad t_{Aepc} = \frac{M_3}{M_2} = 1 - t_o$$

where $t_o$ is the basic ratio of the epicycloid and then we could write $$\frac{t_o - 1}{t_o - 1} * \frac{t_o}{c} = 1 \quad c = -t_o \quad t_o = 2.673$$

This value could be suitably approximated with an epicycloid with the following characteristics:

crown gear $Z = 59$
sun gear $Z = 22$
planetary gear $Z = 17$
which gives a $t_o = 2.673$ case 2)
Motor A directly connected to the sun gear of the epicyclic reduction unit
Motor B connected to the crown gear of the epicyclic reduction unit through a two-speeds gearshift supposing the adjustment of the pump and of the motors constant to c it is obtained that $$c = \sqrt[4]{t.c.r.} = \sqrt[4]{19.09} = 2.0903$$

We could then write $$t_A * t_{Bepc} = t_{IIB} * t_{Bepc} * c \text{ and } t_{IB} * t_{Bepc} = t_{IIB} * t_{Bepc} * c^2$$

from which $$\frac{t_{IB}}{t_{IIB}} = c^2 \text{ and } \frac{t_{IIB}}{t_A} = \frac{-t_o}{c}$$

assuming for $t_o$ the value previously obtained $t_o = -2,6818$ it is obtained $$t_{IIB} = \frac{t_o}{c} * t_A = \frac{2.6818}{2.09030} * t_A$$

choosing thereafter $t_A = 1.033$ (Z 31/30) the two ratios $$t_{IB} = 5,792665 \quad t_{IIB} = 1.325757$$

are obtained.

Figure 5:
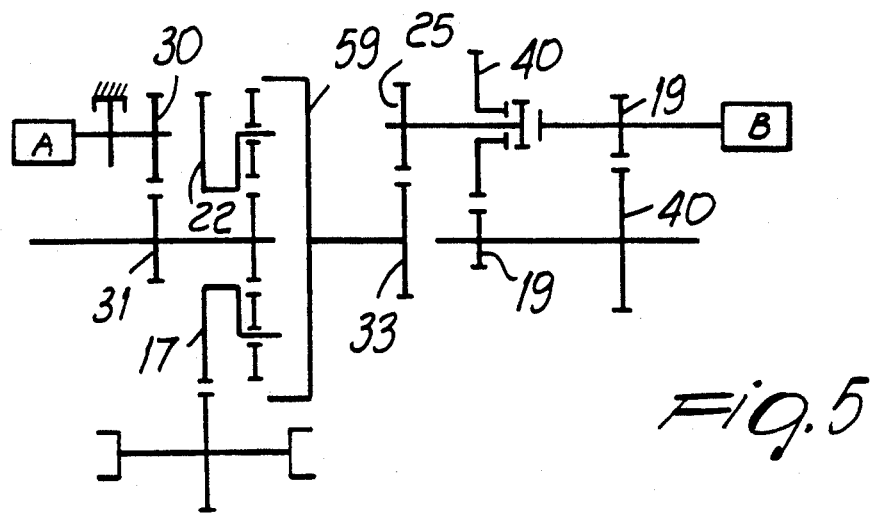
FIG. 5 is a system configuration according to a further case exemplifying the invention.

The system configuration will then be as illustrated in FIG. 5.
case 3)
Motor A connected to the sun gear of the epicyclic reduction unit through a two-speeds gearshift
Motor B connected to the crown gear of the epicyclic reduction unit through a two-speeds gearshift supposing the adjustment of the pump and motors constant and equal to c, it is obtained that $$c\sqrt[5]{t.c.r.} = \sqrt[5]{19.09} = 1.8037$$

Figure 6:
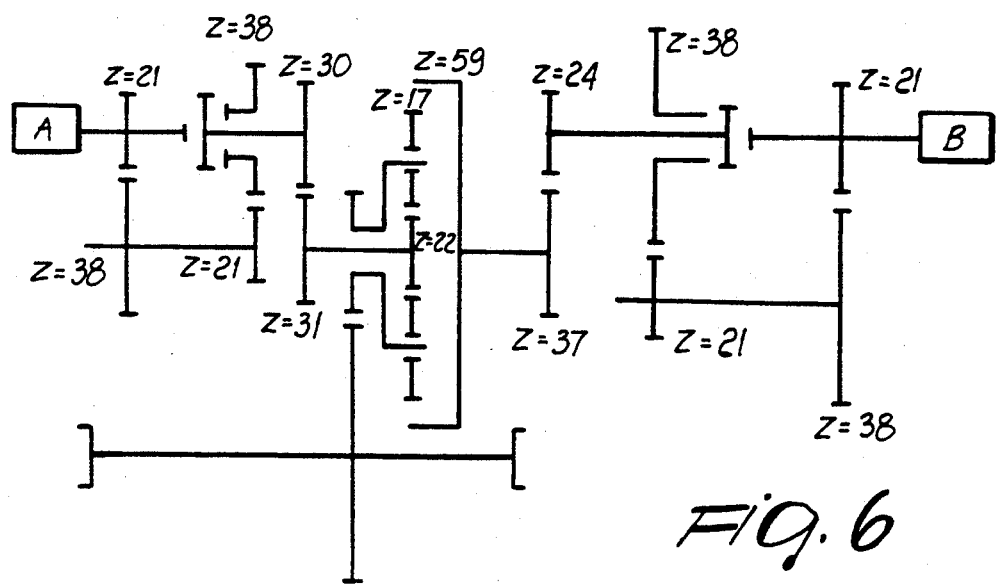
FIG. 6. is a system configuration according to still another case exemplifying the invention.

We could then write the equilibrium equations $$t_{IIA} * t_{Aepc} = t_{IIB} * t_{Bepc} * c$$

$$t_{IB} = t_{IIB} * c^2$$

$$t_{IA} = t_{IIA} * c^2$$

$$t_{IA} * t_{Aepc} = t_{IIB} * t_{Bepc} * c^3$$

from which $$t_{IIA} = 1.033 \quad t_{IIB} = 1.5364$$
$$t_{IA} = 3,3617 \quad t_{IB} = 5$$

and the system configuration will be as illustrated in FIG. 6

The invention thus conceived is susceptible to numerous modifications and variations, all of which are within the scope of the inventive concept.

All the details may furthermore be replaced with other technically equivalent elements.

In practice, the materials employed, as well as the contingent shapes and dimensions, may be any according to the requirements.

I claim

1. Reduction-distribution unit for gearshift units, particularly for industrial machines comprising:
   a first hydrostatic motor;
   a second hydrostatic motor;
   an epicyclic train for operatively associating said first hydrostatic motor and said second hydrostatic motor and for adding and transmitting the power thereof including:
   a sun gear;
   a first shaft connected to said sun gear;
   a first brake associated to said first shaft;
   a crown gear;
   a second shaft connected to said crown gear;
   a second brake associated to said second shaft;
   a spider;
   a plurality of planet gears supported by said spider for meshing with said crown gear and said sun gear; and
   an output gear being keyed to said spider;
   wherein said first hydrostatic motor is associated with said first shaft and said second hydrostatic motor is associated with said second shaft, and said first and said second hydrostatic motor are in fluid communication with a variable-displacement hydrostatic pump.

2. Reduction-distribution unit according to claim 1 further comprising trains interposed between said first and said second hydrostatic motor and said first and said second shaft for connection to said epicyclic train, for adapting hydrostatic motors with different characteristics without varying the equilibrium of said epicyclic train.

3. Reduction-distribution unit according to claim 1, further comprising a further gear for transmitting motion to the axles of said industrial machines, said further gear being meshed with said output gear.

4. Reduction-distribution unit according to claim 1 wherein said first hydrostatic motor associated with said first shaft is directly connected to said sun gear and said second hydrostatic motor associated with said second shaft is directly connected to said crown gear.

5. Reduction-distribution unit according to claim 1 further comprising, between said first hydrostatic motor and said first shaft for connection to said sun gear, a two- or more-speeds gearshift.

6. Reduction-distribution unit according to claim 1 further comprising, between said second hydrostatic motor and said second shaft, for connection to said crown gear, a two- or more-speeds gearshift.

7. Reduction-distribution unit according to claim 1 further comprising simple or multiple friction clutches between said first and said second hydrostatic motor and said first and said second shaft.

8. A method for controlling the reduction-distribution unit of claim 1, said method comprising the steps of:

I. operating only said first hydrostatic motor while locking said second hydrostatic motor by said second brake;

II. releasing said second brake and operating said first hydrostatic motor and said second hydrostatic motor for reaching the same rotation rate; and III. locking said first brake and operating only said second hydrostatic motor.

9. The method of claim 8 wherein step I only adjusts the displacement of said first hydrostatic motor.

10. The method of claim 8 wherein step II only adjusts the displacement of said hydrostatic pump.

11. The method of claim 8 wherein step III only adjusts the displacement of said second hydrostatic motor.

12. The method of claim 8 wherein step II is used for passing from step I to step III without discontinuities.

13. The method of claim 8 wherein said industrial machines have during:

step I, a speed between 2 and 5.5 km/h;
step II, a speed between 5.5 and 13 km/h; and
step III, a speed between 13 and 38 km/h.

* * * * *